Figure 3:
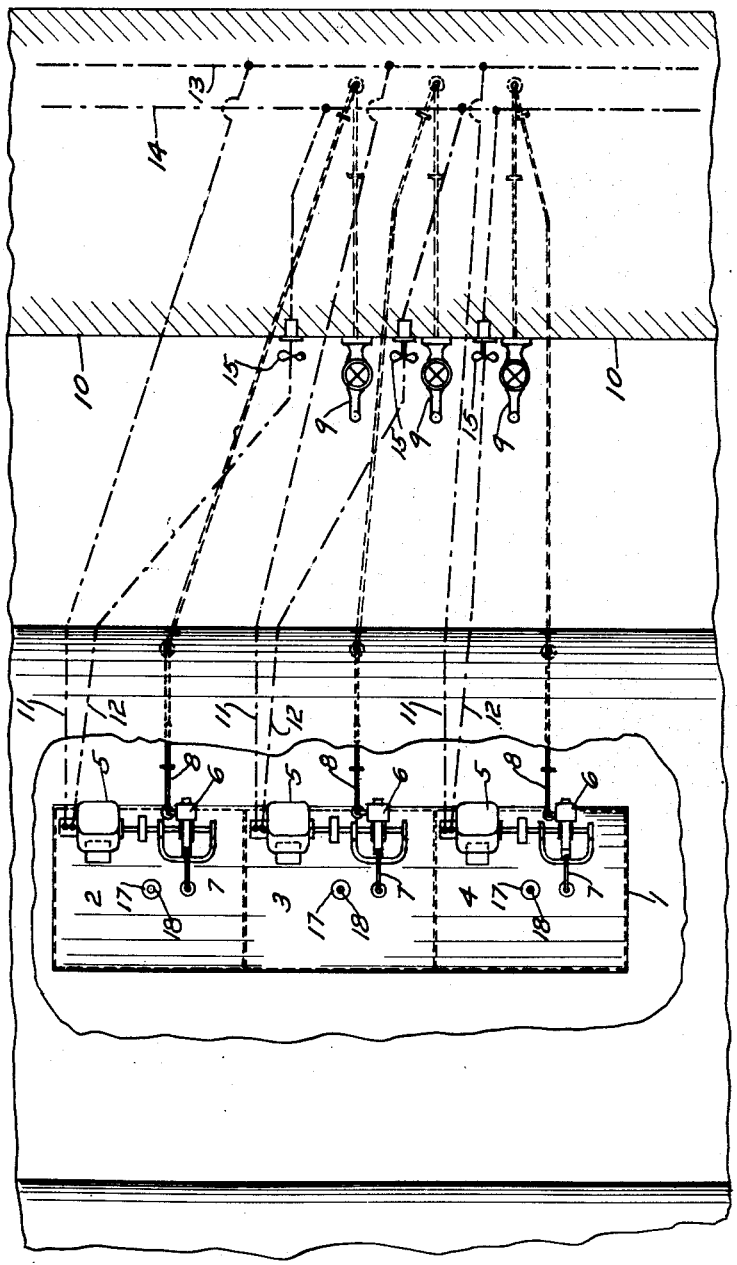

Feb. 16, 1954
C. F. JACKSON
2,669,251
LIQUID SUPPLY SYSTEM FOR AUTOMOBILES
Filed Oct. 9, 1951
2 Sheets-Sheet 1
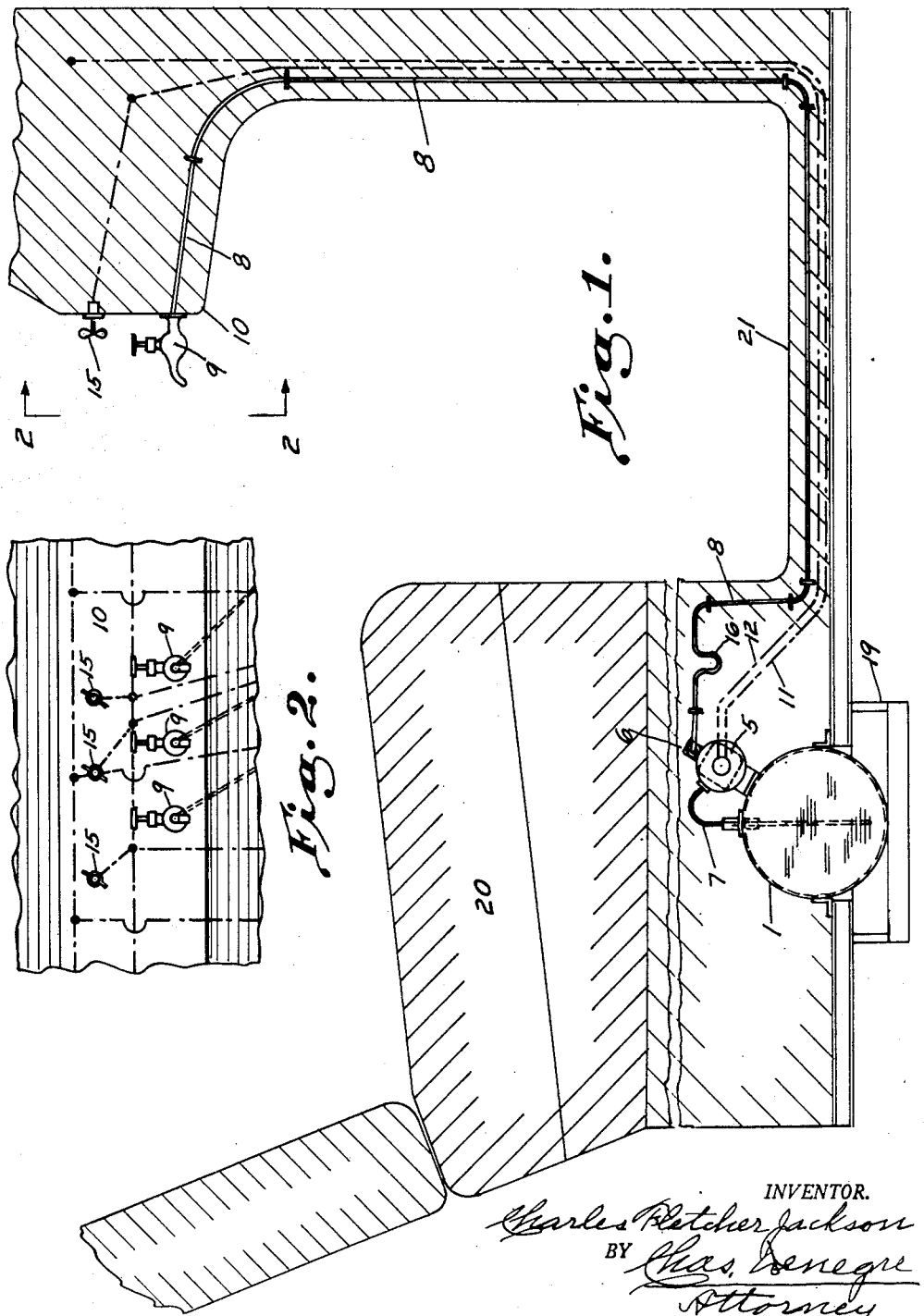
INVENTOR.
Charles Fletcher Jackson
BY Chas. Denegre
Attorney Feb. 16, 1954 C. F. JACKSON 2,669,251
LIQUID SUPPLY SYSTEM FOR AUTOMOBILES
Filed Oct. 9, 1951 2 Sheets-Sheet 2

INVENTOR.
Charles Fletcher Jackson
BY Chas. Denegre
Attorney.

UNITED STATES PATENT OFFICE 2,669,251

LIQUID SUPPLY SYSTEM FOR AUTOMOBILES

Charles Fletcher Jackson, Birmingham, Ala.

Application October 9, 1951, Serial No. 250,388

1 Claim. (Cl. 137—353)

This invention relates to a liquid supply system for use in an automobile or truck. It has for its main objects to provide such a system that will be highly efficient for its purpose, comparatively cheap and simple in structure, and easy to install and use. The system consists of a three compartment container adapted for holding and delivering as wanted, milk, coffee and water or other liquids.

Other objects and advantages will appear from the drawings and description.

By referring generally to the drawing, a part of this application, it will be observed that Fig. 1 is a side elevational view, part full and part in section, showing the front portion of part of an automobile body with the system according to the present invention installed therein; Fig. 2 is a view on line 2—2 of Fig. 1 showing the faucets and electric control switches mounted on the dash panel of an automobile; and Fig. 3 is a plan view showing the entire system in position for use.

Similar reference numerals refer to similar parts throughout the several views.

Referring to the drawings in detail it will be seen that the system consists of a tank 1 with three compartments 2, 3 and 4. Three small electric motors 5, attached to rotary pumps 6 are mounted on top of the tank. Suction pipes 7 lead from the bottoms of the compartments to the pumps, and discharge pipes 8 lead from the pumps to the faucets 9 on the dash panel 10. Electric current wires 11 and 12 lead from the motors to supply wires 13 and 14 and to electric switches 15. Each discharge pipe is provided with a well portion 16. Each compartment is provided with a filler cap 17 having a vent hole 18. The tank with motors and pumps is preferably installed in a case 19 positioned below the seat 20, and may be placed lower and below the floor level 21 of the body if desired. Also the tank assembly may be installed in the trunk compartment (not shown) of an automobile. Wire 13 is connected to the battery (not shown) of the automobile. Wire 14 is attached to any part of the chassis.

From the foregoing it will appear that in order to use the system a faucet is opened, then its companion switch is turned to contact position thereby causing its companion motor and pump to operate and discharge the desired liquid. When sufficient liquid is obtained the switch is turned to off position with its companion faucet remaining open to thus allow the liquid in the pipe to flow back into the compartment, then the faucet is closed.

The various parts of the system may be made of any material suitable for the purpose. Also the parts may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A liquid supply system of the character described in combination with an automobile comprising, a tank, said tank having three separate compartments, each of said compartments having mounted thereon and in connection therewith a small electric motor and a small rotary pump for operation by the motor, a suction pipe leading from the pump to the interior bottom of the compartment on which the pump is located, a discharge pipe, a faucet, said discharge pipe leading from said pump to said faucet, said faucet being mounted on the dash panel of said automobile, electric current supply wires connected to said motor, an electric switch mounted on said panel near said faucet, said wires leading from said motor having connections to said switch for control of said motor; each of said compartments having a filler cap with a ventilating opening in the top of the cap; each of said discharge pipes having an integral well portion positioned near its companion pump; said assembled parts mounted within the structure of said automobile.

CHARLES FLETCHER JACKSON.

References Cited in the file of this patent

UNITED STATES PATENTS

| Number | Name | Date |
|---|---|---|
| Re. 18,063 | Steinhauser | May 5, 1931 |
| 103,453 | Hamilton | May 24, 1870 |
| 1,448,508 | Thum | Mar. 13, 1923 |
| 1,969,960 | Blum | Aug. 14, 1934 |
| 2,421,765 | Taylor | June 10, 1947 |
| 2,547,613 | Bailey | Apr. 3, 1951 |